(No Model.)
L. & A. APPERT.
PERFORATED GLASS.
No. 376,844. Patented Jan. 24, 1888.
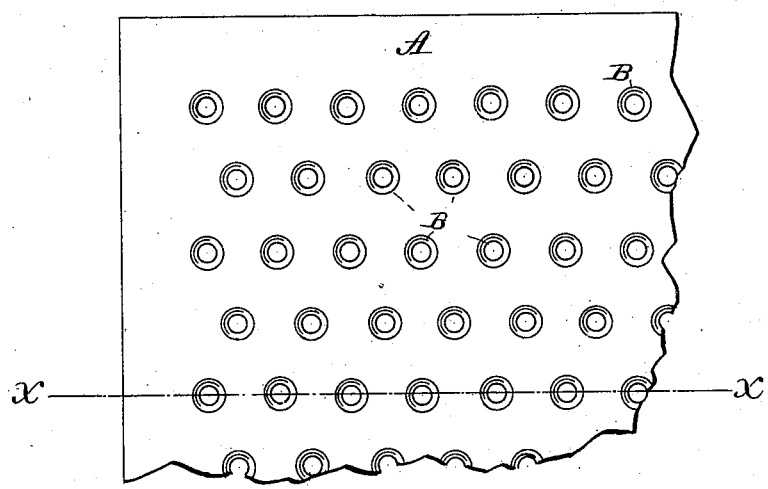
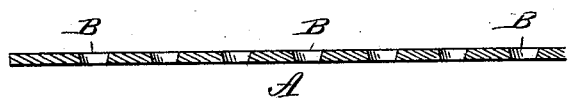
WITNESSES:
INVENTOR:
BY
ATTORNEYS.

UNITED STATES PATENT OFFICE.

LÉON APPERT AND ADRIEN APPERT, OF PARIS, FRANCE.

PERFORATED GLASS.

SPECIFICATION forming part of Letters Patent No. 376,844, dated January 24, 1888.

Application filed October 26, 1886. Serial No. 217,205. (No model.) Patented in France April 9, 1885, No. 168,270.

*To all whom it may concern:*

Be it known that we, LÉON APPERT and ADRIEN APPERT, both of Paris, France, have invented a new and useful Improvement in Perforated Glass, (patented by us in France, April 9, 1885, No. 168,270,) of which the following is a full, clear, and exact description.

Our invention relates, principally, to the production of glass plate formed with perforations of novel design, and adapted to be used for purposes of ventilation in lieu of ordinary window-glass and in various other situations, as hereinafter set forth.

The invention consists in plate glass or crystal formed with numerous conical or other flaring perforations, whereby a more rapid passage of air and other substances is permitted, as and for the purposes hereinafter explained.

Reference is to be had to the accompanying drawings, forming a part of this specification, in which similar letters of reference indicate corresponding parts in both the figures.

Figure 1 is a plan view illustrating our improved perforated glass. Fig. 2 is a sectional view taken on the line $x\ x$, Fig. 1.

The glass plate A is formed with a number of perforations, B, which may be conical, as shown, pyramidical or otherwise flaring, and may be uniformly spaced, clustered, or variously arranged at will to produce designs, as of flowers, leaves, animals, &c.

The principal application of the perforated glass is for ventilating houses and other structures, in which case the glass is made in sheets or panes and is employed in place of the ordinary window-glass, the larger ends of the flaring perforations being arranged on the inside, thus allowing a rapid diffusion of the outside air into the room, which injurious drafts or currents of air are entirely obviated, as the air disperses in all directions as it emerges from the inner expanded mouths of the apertures or perforations.

If desired, two similarly-perforated panes may be arranged to slide upon each other, so that the size of the openings may be regulated and the requisite amount of ventilation obtained. The perforated glass can also be used to form sieves or filters, where corrosive materials exclude the use of metals, and also to form diaphragms to be applied to pipes or columns in which corrosive liquids or gases circulate.

Further, the perforations may be filled with applications of different kinds—such as enamels, ceramics, &c.—and by suitably arranging the colors of the glass body and the fillings various designs may be produced.

The perforations may be formed in ordinary window or other glass by drilling, by the sand-blast, or in any other well-known way; but we prefer to form them by pressing the fluid or semi-fluid glass upon numerous fixed prominences or projections of the required form.

For carrying on this process we have designed a machine of novel construction, which, however, needs no description here, as it forms the subject-matter of a separate application by us filed herewith. The perforated glass thus produced can be treated as any other glass and decorated in various ways, which decorations can be combined with those produced by various arrangements of the perforations and colorings of the materials used as filling to produce ornamental designs of every style.

We are aware that heretofore glass plate has been formed with apertures for various purposes; but we are not aware that flaring apertures, as herein described, have been formed therein previous to our invention.

Having thus described our invention, what we claim as new, and desire to secure by Letters Patent, is—

Glass or vitreous plate formed with a number of conical or other flaring perforations, substantially as and for the purposes set forth.

LÉON APPERT.
ADRIEN APPERT.

Witnesses:
A. CHILLY,
D. BLOCH.